United States Patent [19]

Ozur et al.

[11] Patent Number: 5,247,676
[45] Date of Patent: Sep. 21, 1993

[54] RPC BASED COMPUTER SYSTEM USING TRANSPARENT CALLBACK AND ASSOCIATED METHOD

[75] Inventors: Mark C. Ozur, Redmond; Charles T. Lenzmeier, Bothwell; Thomas J. Miller, Bellevue, all of Wash.

[73] Assignee: Digital Equipment Corporation, Maynard, Mass.

[21] Appl. No.: 830,730

[22] Filed: Feb. 4, 1992

Related U.S. Application Data

[63] Continuation of Ser. No. 374,100, Jun. 29, 1989.

[51] Int. Cl.[5] .................. G06F 9/38; G06F 9/40; G06F 9/42
[52] U.S. Cl. .................. 395/650; 395/200; 364/DIG. 1; 364/228.3; 364/230; 364/230.3; 364/230.4; 364/231.6; 364/281.3; 364/281.7
[58] Field of Search .............. 395/650, 600, 200; 364/DIG. 1, DIG. 2

[56] References Cited

U.S. PATENT DOCUMENTS

| | | | |
|---|---|---|---|
| 4,530,051 | 7/1985 | Johnson et al. | 395/200 |
| 4,635,189 | 1/1987 | Kendall | 395/600 |
| 4,649,480 | 3/1987 | Ohki et al. | 395/700 |
| 4,694,396 | 9/1987 | Weisshaar et al. | 395/200 |
| 4,754,395 | 6/1988 | Weisshaar et al. | 395/650 |
| 4,780,821 | 10/1988 | Crossley | 395/650 |
| 4,825,354 | 4/1989 | Agrawal et al. | 395/600 |
| 4,845,658 | 7/1989 | Gifford | 395/275 |
| 4,849,877 | 7/1989 | Bishop et al. | 395/200 |
| 4,852,021 | 7/1989 | Inoue et al. | 395/775 |
| 4,868,818 | 9/1989 | Madan et al. | 371/11.3 |
| 4,870,571 | 9/1989 | Frink | 395/200 |
| 4,897,781 | 1/1990 | Chang et al. | 395/600 |
| 4,901,231 | 2/1990 | Bishop et al. | 395/325 |
| 4,924,384 | 5/1990 | Hao et al. | 395/500 |
| 4,930,069 | 5/1990 | Batra et al. | 395/275 |
| 4,949,255 | 8/1990 | Gerth et al. | 395/725 |
| 5,005,122 | 4/1991 | Griffin et al. | 395/200 |
| 5,007,080 | 4/1991 | MacMillan et al. | 379/269 |
| 5,020,059 | 5/1991 | Gorin et al. | 395/200 |
| 5,040,142 | 8/1991 | Mori et al. | 395/275 |
| 5,050,070 | 9/1991 | Chastain et al. | 395/375 |
| 5,063,500 | 11/1991 | Shorter | 395/200 |

Primary Examiner—Michael R. Fleming
Assistant Examiner—Ayaz R. Sheikh
Attorney, Agent, or Firm—Flehr, Hohbach, Test, Albritton & Herbert

[57] ABSTRACT

A method is provided for use in a computer system, the method for performing callbacks to a first calling thread that has made an RPC to a second called thread comprising the steps of: creating at least one respective helper thread in the address space of the second called thread; and for each respective created helper thread, providing a respective thread-specific identifying mechanism for identifying the first calling thread.

14 Claims, 4 Drawing Sheets

RPC BASED COMPUTER SYSTEM USING TRANSPARENT CALLBACK AND ASSOCIATED METHOD

This is a continuation of application Ser. No. 07/374,100 filed Jun. 29, 1989.

BACKGROUND OF THE INVENTION

1. Field of the Invention

The invention relates generally to remote procedure calls and, more particularly, to callbacks in remote procedure calls.

2. Description of the Related Art

A thread is a software construct that executes computer programs in an operating environment. A thread typically possesses a program counter, a register set and its own private stack. An address space provides the context in which a thread executes. An address space is a range of addresses used by a program. In a virtual address space, the addresses used by a program do not necessarily correspond to physical addresses of a computer system.

In a multithreaded environment, a single address space can have more than one thread simultaneously executing a program. Multithreading, for example, can involve parallel execution of a single program in a computer system, and it can involve the execution of multiple threads on behalf of different clients in a single address space.

A remote procedure call (RPC) is a procedure call in which a called routine executes in a different address space and thread than the calling routine. An RPC ordinarily involves the passing of a message from one address space to another address space. RPCs can be made to a thread in the same computer system or in a remote computer system.

While processing an RPC, a called thread sometimes creates helper threads to help in processing the call. Such helper threads execute in parallel with the original called thread. When the helper threads have completed their execution, the called thread ordinarily completes processing of the RPC call by returning results of the call to the calling thread.

A callback is a nested RPC in which either a called thread or a helper thread makes an RPC callback to the calling thread. Typically, for example, when a called thread is invoked through an RPC, information that identifies the calling thread is stored in a call block in the address space of the called thread. The identifying information in the call block is used to locate the calling thread during callbacks.

Often, information is stored in conjunction with a call block that indicates when a callback is in progress. Such information can be used, for example, to delay a callback to the calling thread until another callback by another thread has been completed.

Furthermore, status information frequently is stored in conjunction with a call block that indicates whether an RPC call represented by the call block has completed. After the call has completed, helper threads are precluded from calling back to the calling thread.

While earlier systems and methods for using RPC callbacks generally have been successful, there have been shortcomings with their use. For example, such earlier systems and methods generally did not involve callbacks from helper threads in a multithreaded environment. It is desirable that an RPC mechanism service callbacks from helper threads in substantially the same manner that it services callbacks from an originally called thread.

Therefore, there has been a need for a system and a method for use in a multithreaded environment in which helper threads can invoke an RPC callback to a calling thread in substantially the same manner that an originally called thread invokes RPC callbacks to the calling thread. The present invention meets this need.

SUMMARY OF THE INVENTION

The present invention provides a method for use in a computer system in which callbacks can be made to a first calling thread that has made an RPC to a second called thread. The method includes the step of creating at least one helper thread in the address space of the second called thread. For each created helper thread, a respective thread-specific identifying mechanism is provided for identifying the first calling thread.

The use of such a thread-specific identifying mechanism advantageously permits an RPC mechanism to service callbacks from an originally called thread in substantially the same manner that it services callbacks from helper threads. Thus, in a multithreaded environment, the servicing of callbacks is simplified because callbacks are handled similarly for both originally called threads and helper threads.

These and other features and advantages of the present invention will be apparent to those skilled in the art from the following detailed description in conjunction with the appended drawings in which:

These and other features and advantages of the present invention will be more apparent from the following description of an exemplary embodiment thereof, as illustrated in the accompanying drawings.

DESCRIPTION OF THE PREFERRED EMBODIMENT

The present invention comprises a novel computer system using RPC callbacks and an associated method. The following description is presented to enable any person skilled in the art to make and use the invention, and is provided in the context of the particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
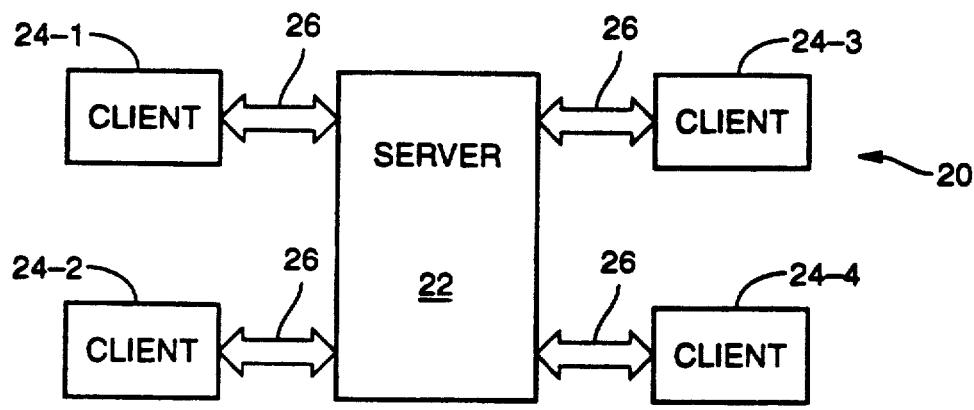
FIG. 1 is a block diagram of a computer network in accordance with a presently preferred embodiment of the invention.

Referring to the illustrative drawings of FIG. 1, there is shown a block diagram of a computer network 20 in accordance with the present invention. The network includes a server 22 connected to multiple client systems 24-1, 24-2, 24-3 and 24-4 by networking hardware and software 26. The client systems, for example, can be workstations such as client systems 24-1 and 24-3 or can be time share systems such as client systems 24-2 and 24-4, each of which possess different address spaces from each other and from the server 22. In the presently preferred embodiment, the network hardware and software comprises a Remote Procedure Call (RPC) system described more fully below. The server, for example, can be a high performance compute server used primarily for its computational power or, for example, it can be a file server used for distributed file access.

Figure 2:
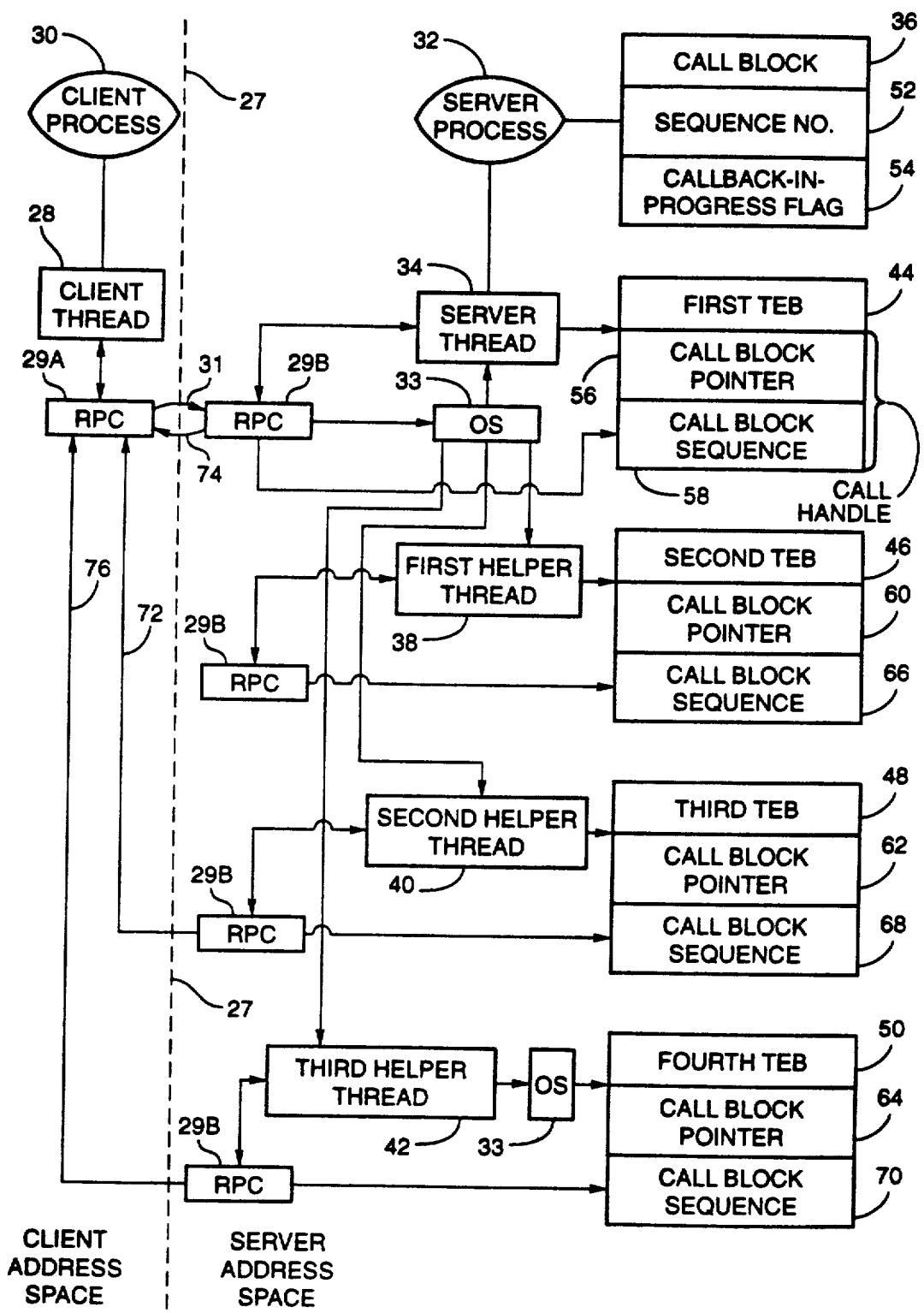
FIG. 2 is a block diagram of a data structure for a calling client thread and a called server thread in accordance with a presently preferred embodiment of the invention.

Referring to the illustrative block diagram of FIG. 2, there is shown a data structure for performing callbacks from a helper thread in a multithreaded environment to a calling client process. A calling client process 30 is located in a client address space illustrated to the left of dashed line 27. A called server process 32 is illustrated in a server address space shown to the right of dashed line 27. In a presently preferred embodiment of the invention, the client and server address spaces are virtual address spaces. It will be appreciated that the client and server address spaces can be located in different network entities such as one of the client systems and the server of FIG. 1; or they can both be located in a single entity such as the server of FIG. 1.

A calling client thread 28 in a client process 30 in the client address space uses an RPC mechanism 29 to make an RPC 31 to a server process 32 and thread 34 in a server address space. A Call Block 36 associated with the called server process 32 includes information that identifies the calling client thread 28. The Call Block 36 can be in the server Address space; or it can be in a different shared address space accessible to the called server thread 34 and its helper threads. First, second and third helper threads 38, 40 and 42 help the called server thread 34 to process the RPC from the calling client thread 28. The called server thread and each of the helper threads are associated respectively with Thread Execution Blocks (TEBs) 44, 46, 48 and 50. Each of the TEBs contains information that identifies the Call Block 36. The helper threads can all be in the server Address Space; or they can be in different address spaces (not shown) that share access to the address space containing the Call Block 36.

The TEBs are a form of thread-specific private storage that ordinarily is used to store thread-specific private information about the execution environment of the thread such as a user's natural language, for example. As explained more fully below, the respective TEBs advantageously can be directly accessed by the RPC mechanism 29 in the event that a thread makes an RPC callback to the calling client thread 28. By providing for each thread a corresponding TEB that contains thread-specific information regarding the Call Block 36 and the original RPC call to the server thread 34, the RPC mechanism is able to use substantially the same steps to service RPC callbacks from the called server thread 34 and from each of the helper threads. More particularly, the information stored in the TEBs can be used to identify the Call Block 36, and the Call Block can be used to identify the calling client thread 28.

During a callback to the calling client thread 28 by the called server thread or by any of the helper threads, an RPC mechanism 29, discussed more fully below, accesses the respective TEB of the thread requesting the callback. The RPC mechanism 29 uses the information in the respective accessed TEB to identify the Call Block 36. Information in the Call Block 36 then is used to identify the calling client thread 28. Thus, the RPC mechanism uses information in the TEBs to identify a calling client thread during a callback. Consequently, a thread requesting a callback need not explicitly pass information to the RPC mechanism in order to identify such a calling client thread.

Figure 3:
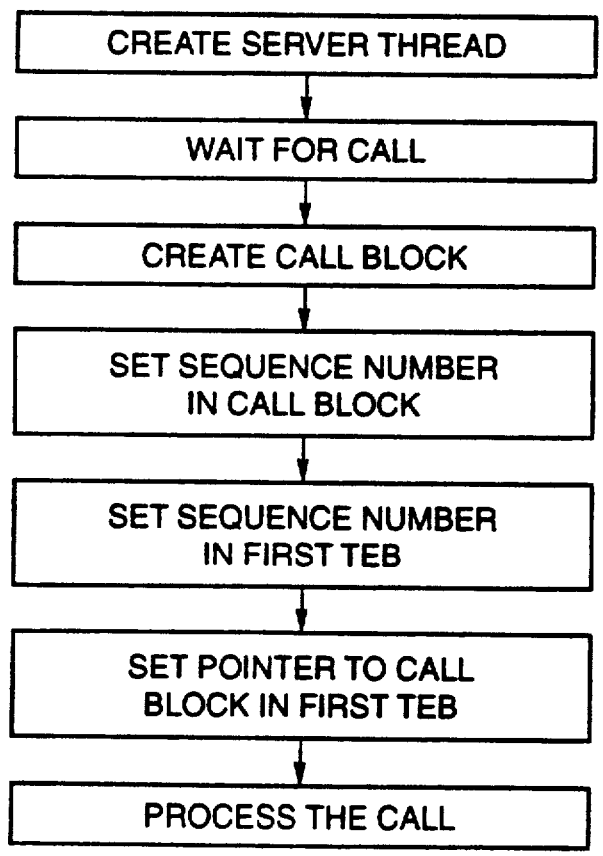
FIG. 3 is an illustrative flow diagram that shows the steps in making an RPC call using the data structure of FIG. 2.
Figure 4A:
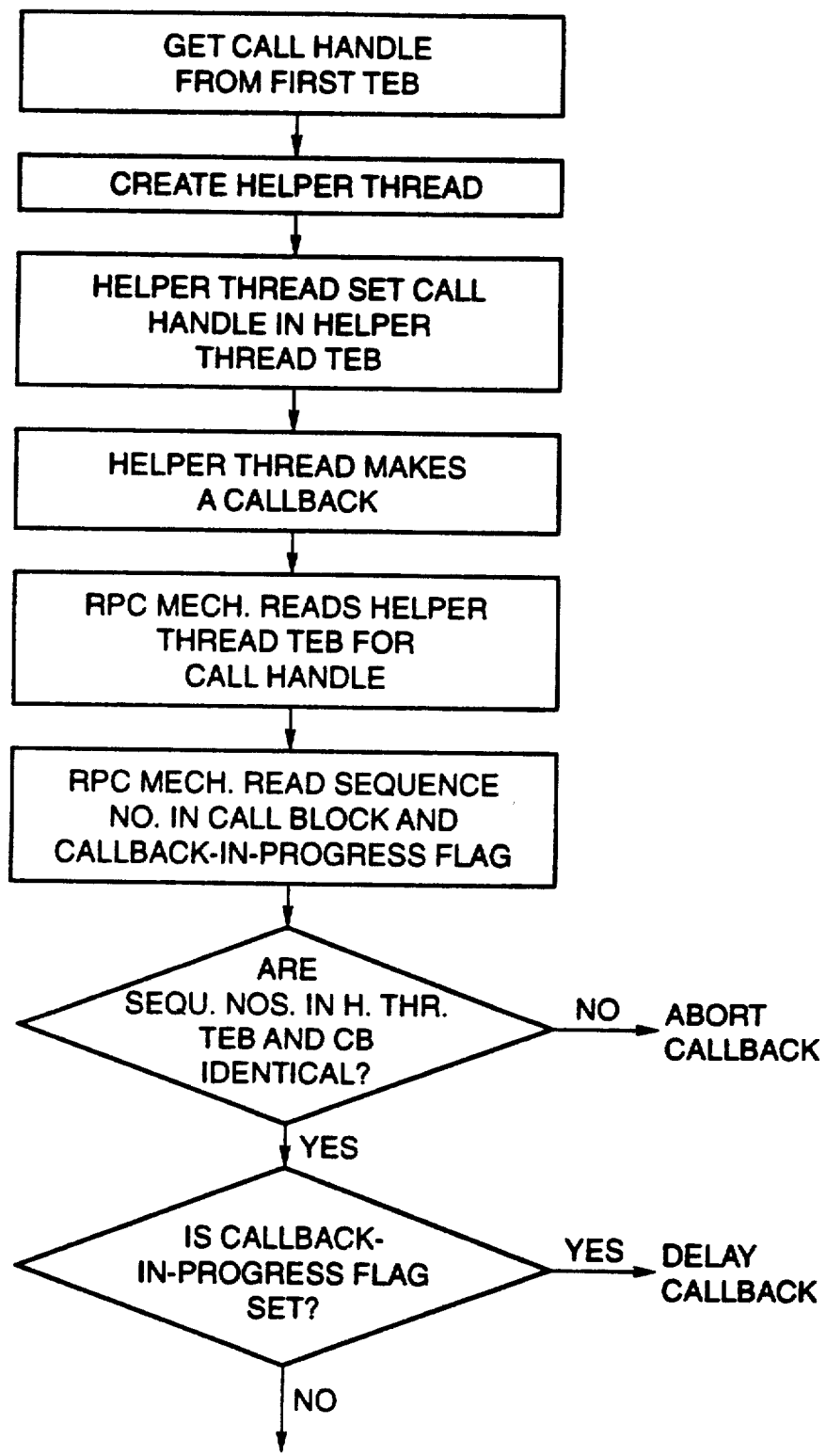
FIGS. 4A-B are illustrative flow diagrams that show the steps making RPC callbacks using the data structure of FIG. 2.
Figure 4B:
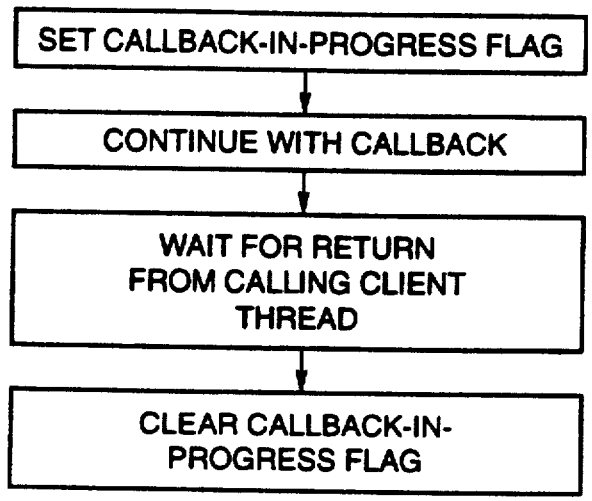

During the following description of the use of the illustrative data structure of FIG. 2, reference should be made to the illustrative Flow Diagrams of FIGS. 3 and 4A-B which provide flow diagrams that illustrate the steps in using the data structure. In particular, FIG. 3 illustrates the steps in making an RPC call, and FIGS. 4A-B illustrate the steps in making an RPC callback.

More specifically, when the calling client thread 28 in the client process 30 makes the RPC 31 through the RPC mechanism 29 to the server process 32, the server thread 34 is created. The RPC mechanism creates the Call Block 36 which stores information that identifies the location of the calling client thread 28. The Call Block 36 also stores a unique sequence number 52 that uniquely corresponds to the RPC call 31. Additionally, the Call Block stores a Callback-In-Progress Flag 54 used to indicate whether or not a callback is in progress.

In a presently preferred embodiment of the invention, multiple threads used to process the RPC 31 can simultaneously execute independently of each other. Thus, it is possible that one or more of the helper threads may request a callback after the called server thread 32 has completed processing the RPC call. This is undesirable because, for example, such a callback by a helper thread might corrupt data in the client address space. As explained below, the unique sequence number 52 stored in the Call Block 36 for RPC 31 is used to prevent the occurrence of such late callbacks.

Furthermore, it is possible that two or more threads such as the called server thread 34 and the second helper thread 40, for example, might contemporaneously request an RPC callback to the calling client thread 28. Such contemporaneous multiple callbacks are undesirable because the original calling client thread 29 may be busy. As explained below, the Callback-In-Progress Flag 54 is used to prevent the occurrence of such overlapping callbacks.

In the course of the call 31, the RPC mechanism 29 calls an operating system utility 33 that creates the server thread 34 and the first TEB 44. The RPC mechanism 29 stores in the first TEB a Call Block Pointer 56 and the Call Block sequence number 58. Together, the Call Block Pointer 56 and the sequence number 58 represent the "call handle" of the called server thread 34.

In the course of processing the RPC call from the calling client thread 28, for example, the server thread 34 may determine that it requires helper threads to assist in the processing of the original RPC call 31. The called server thread 34 makes calls to the RPC mechanism 29 which, in turn, calls the operating system utility 33. The operating system utility creates the first, second and third helper threads 38, 40 and 42, and the respective second, third and fourth TEBs 46, 48 and 50. The RPC mechanism 29 passes the call handle from the first TEB to the respective second, third and fourth TEBs. Thus, each of the TEBs includes a respective Call Block pointer 60, 62 and 64 that points to the Call Block 36 and includes a sequence number 66, 68 and 70 that is identical to the sequence number in the Call Block 36.

During the processing of the RPC 31 from the calling client thread 28, for example, the second helper thread 40 may invoke a callback 72 to the calling client thread 28 through the RPC mechanism 29. In the course of performing the callback 72, the RPC mechanism 29 accesses the third TEB 48 which is associated with the second helper thread 40. The Call Block pointer 62 is used by the RPC mechanism 29 to identify the Call Block 36. The RPC mechanism 29 compares the sequence number 52 in the Call Block 36 with the sequence number 66 in the second TEB 46. In this case, for example, they are identical. If the sequence numbers were not identical, then the callback would be precluded, and the RPC mechanism 29 would stop processing.

Since the sequence numbers do match, the RPC mechanism 29 observes the Callback-In-Progress Flag 54 in the Call Block 36 to ascertain whether another callback currently is in progress. At this point, no other callback is in progress. The RPC mechanism 29 sets the Callback-In-Progress Flag 54, and then proceeds in servicing the callback by the second helper thread 40 to the calling client thread 28. The second helper thread 40 then enters a wait state while it awaits processing of the callback 72 by the calling client thread 28.

While the second helper thread 40 is in the wait state, for example, the called server thread 34 requests an RPC callback 74 to the calling client thread 28 through the RPC mechanism 29. In response to the request, the RPC mechanism accesses the first TEB 44 to ascertain the Call Block pointer 56. The RPC mechanism 29 compares sequence number 58 to sequence number 52. In this case they are identical. The RPC mechanism then observes the Flag 54 which indicates that a callback 72 (by the second helper thread) is in progress. In response, the RPC mechanism delays the servicing of the callback by the called server thread 34 until the second helper thread 40 completes its callback. After the second helper thread 40 receives a return from the calling client thread 28 through the RPC mechanism 29, the RPC mechanism proceeds with the servicing of the callback invoked by the called server thread 34. Of course, during the processing of the callback by the calling client thread 28, the Flag 54 is set, and the called server thread 34 is in a wait state.

After completion of the RPC 31, the sequence number 52 in the Call Block 36 will be different from, the sequence numbers in any of the TEBs 44, 46, 48, and 50. More particularly, after the called server thread 34 completes the processing of the RPC 31, and returns resulting information to the calling client thread 28, via the RPC mechanism 29, the RPC mechanism causes the sequence number 52 in the Call Block 36 to be changed to a new sequence number. In a presently preferred embodiment of the invention, the sequence number is set to all zeros upon completion of an RPC call by the called server thread 34. In the event that after the completion of the call 31, another calling client process (not shown) makes a new call (not shown) to another called server thread (not shown) that uses the same Call Block 36, the RPC mechanism 29 will cause a different unique sequence number to be loaded into the Call Block 36.

Subsequently, after the called server thread 34 has completed processing the RPC call 31 as explained above, for example, the third helper thread 42 may request the RPC mechanism 29 to perform a callback 76 to the client thread 28. In response to the request, the RPC mechanism 29 accesses the fourth TEB 50 and ascertains the Call Block pointer 64 to the Call Block 36. The RPC mechanism observes that the sequence number 70 in the fourth TEB does not match the sequence number in the Call Block 36. In response to the mismatch, the RPC mechanism prevents the requested callback.

Figure 5:
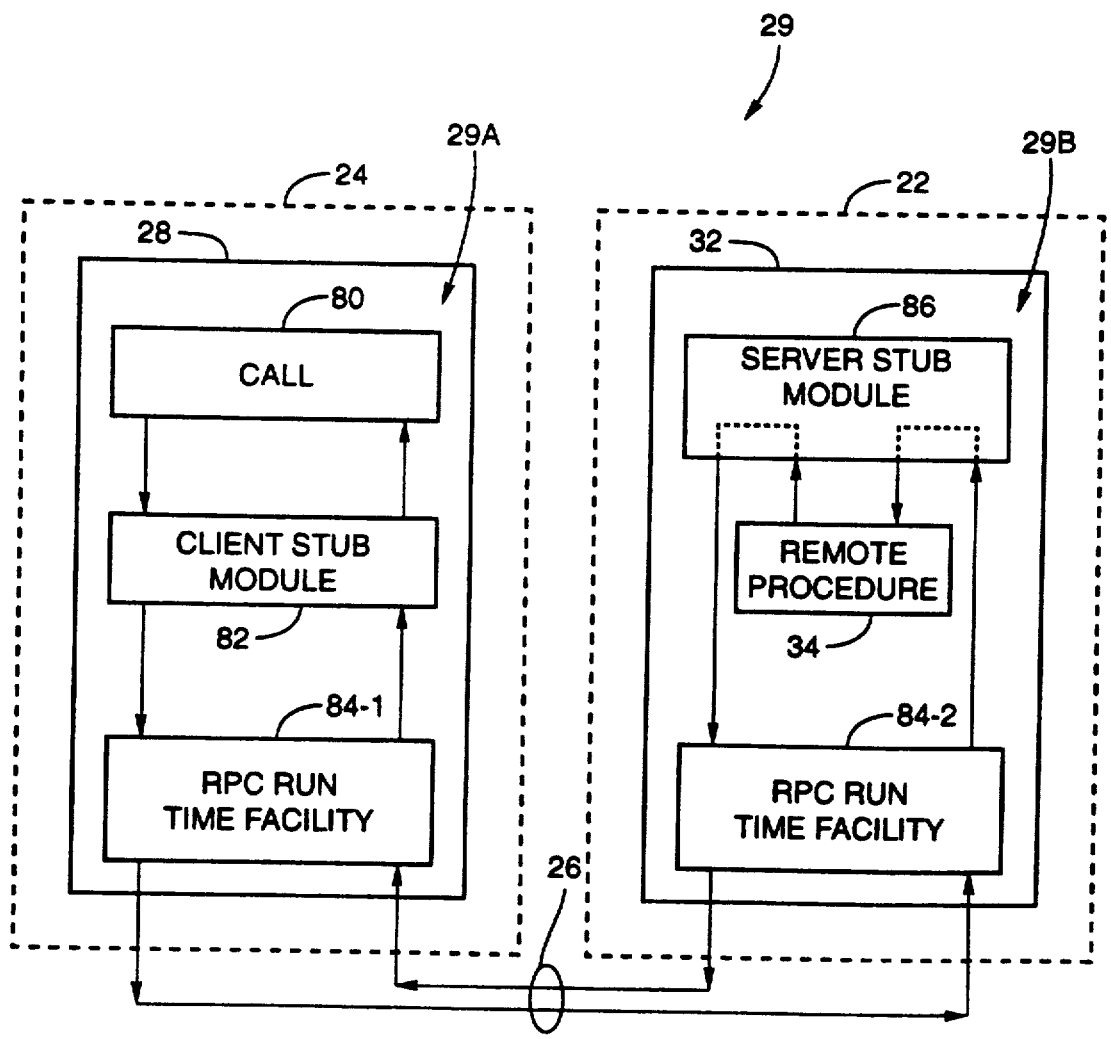
FIG. 5 is a block diagram of an RPC mechanism for use in conjunction with the data structure of FIG. 2.

Referring to FIG. 5, there is shown an RPC mechanism 29 in accordance with a presently preferred embodiment of the invention. The RPC mechanism includes a first RPC component 29A in the client address space and a second component 29B in the server address space. Referring back to FIG. 2, the second helper thread 38 can use the RPC mechanism 29 to make a callback 72 to the calling client thread 28. Similarly, the called server thread 34 can use the RPC mechanism 29 to make a callback 74 to the calling client thread 28.

Referring once again to FIG. 5, when a remote procedure is called, a calling thread, such as the calling client thread 28, is suspended, parameters are passed across a communications medium, such as the network hardware and software 26, to a called thread, such as the called server thread 34. A called procedure, in the server process 32, then is executed. An underlying RPC run-time facility 84-1, 84-2 handles the passing of parameters and control between threads that communicate through such an RPC mechanism 29.

More particularly, referring once again to FIG. 2, for example, in the course of an RPC call by the calling client thread 28 to the called server thread 34, the calling client thread 28 calls a procedure 80 that resides in the client address space. The call to procedure 80 results in a call to a client stub routine within a client stub module 82.

In response to the call to the client stub module 82, the called client stub routine packages the calling arguments into a canonical format. The arguments in the canonical format then are passed to the server program using the RPC run-time facility 84-1 and 84-2.

It will be understood that a canonical format is merely one of numerous possible formats that can be used to transfer arguments. Alternative formats, for example, can be agreed upon by the client process 30 and the server process 32 using the RPC Run-Time Facility 84-1, 84-2 to carry out the agreement.

The RPC run-time facility 84-2 in the server address space receives the arguments in the canonical format, processes the arguments and calls an appropriate server stub module 86 which includes a server stub routine that unpacks the arguments packaged by the client stub routine. The server stub of the server stub module 86 places the arguments in a form that the called server thread 34 in the server address space can process.

In response to the calling arguments unpacked by the server stub, the RPC server thread 34 produces the first, second and third helper threads 38, 40 and 42 described above.

During the callbacks described above for the second helper thread 40, for example, information is transported to the calling client thread 28 via a server stub in the server stub module 86, the RPC run-time facility 84-2 in the server address space and the RPC run-time facility 84-1 in the client address space. A client stub in the client stub module 82 on the client side receives the information, unpacks it and places it in a form that can be processed by the calling client thread 28.

One skilled in the art will appreciate that the client stub module 82 and the server stub module 86 typically are a part of the operating environment in which an application program runs and are independent of the application program. A device known as a stub generator (not shown) defines the stub procedures to be accessed via the RPC. More specifically, a stub generator is used to produce respective client stubs in the client stub module 50 and respective server stubs in the server stub module 54.

Furthermore, it will be understood that stub modules are convenient mechanisms that permit a software programmer to write a call without the need to understand details of the underlying run-time facilities. The stub modules package and unpackage arguments. Alternatively, an RPC call or an RPC callback could be made in which the call or callback was made directly to the RPC run-time facilities without using stub modules.

Moreover, instead of using thread-specific TEBs to store call handles, alternative thread-specific private storage could be used to store the call handles. In using such alternate thread-specific private storage, the RPC mechanism 29 would access such alternative storage during callbacks to locate the calling client thread 28.

Thus, while the present invention has been described with reference to a few specific embodiments, the description is illustrative of the invention and is not to be construed as limiting the invention. Various modifications may occur to those skilled in the art without departing from the true spirit and scope of the invention as defined by the appended claims, in which:

What is claimed is:

1. In a computer system including a calling thread in a client address space, a called server thread in a server address space, means for creating a thread of execution in any specified address space and means for transporting messages between the calling thread and the called server thread; a method performed by said computer system for processing a remote procedure call by the calling thread to the called server thread, comprising the steps of:
    transporting the remote procedure call from the calling thread to the called server thread, identifying the calling thread with a call block and storing said call block in the server address space;
    creating in the server address space at least one respective helper thread;
    initiating a callback by the at least one respective helper thread to the calling thread; and
    performing said initiated callback to the calling thread by accessing said call block to identify the calling thread, and then transporting said callback to the calling thread.

2. The method of claim 1, said computer system further performing the steps of:
    upon transporting said callback to the calling thread, storing a callback indicator in said call block to indicate that a callback to the calling thread is in progress;
    when said computer system initiates subsequent callbacks from the at least one respective helper thread to the calling thread, accessing said call block to determine whether another callback to the calling thread is in progress, and delaying transportation of each subsequent callback to the calling thread while said callback indicator indicates that another callback is in progress; and
    upon completion of each callback, deleting said callback indicator in said call block.

3. The method of claim 2, further including:
    blocking transportation of callbacks to the calling thread from the at least one respective helper thread after the called server thread has completed processing of the remote procedure call from the calling thread.

4. The method of claim 2, further including:
    upon completing processing of the remote procedure call to the called server thread, storing in the call block a completion indicator indicating that the called server thread has completed processing of the remote procedure call;
    during said step of accessing said call block during callbacks by each respective helper thread, determining if said call block contains said completion indicator; and
    preventing callbacks by the at least one respective helper thread to the calling thread when said call block contains said completion indicator.

5. The method of claim 1, further including:
    upon completing processing of the remote procedure call to the called server thread, storing in the call block a completion indicator indicating that the called server thread has completed processing of the remote procedure call;
    during said step of accessing said call block during callbacks by each respective helper thread, determining if said call block contains said completion indicator; and
    preventing callbacks by the at least one respective helper thread to the calling thread when said call block contains said completion indicator.

6. The method of claim 1, further including:
    blocking transportation of callbacks to the calling thread from the at least one respective helper thread after the called server thread has completed processing of the remote procedure call from the calling thread.

7. The method of claim 1, further including:
    storing for each respective helper thread a thread execution block having a pointer to said call block; and
    said step of accessing said call block including accessing said respective thread execution block to retrieve said pointer to said call block and then accessing said call block with said retrieved pointer.

8. A computer system comprising:
    a calling client thread in a client address space;
    a called server thread in a server address space;
    remote procedure call (RPC) means for transporting a remote procedure call from the calling thread to the called server thread;
    means for identifying said calling thread with a call block and storing said call block in the server address space;
    means for creating at least one respective helper thread in the server address space; and
    callback means for processing a callback by each respective helper thread to said calling thread by accessing said call block to identify said calling thread and then transporting said callback to said calling thread.

9. The computer system of claim 8, further including:
    said callback means including means for storing in said call block a callback indicator when said computer system initiates a first call back from the at least one respective helper thread to said calling thread to indicate that a callback to said calling thread is in progress;

means for accessing said call block, when said computer system initiates subsequent call backs from the at least one respective helper thread to said calling thread, to determine whether another callback to said calling thread is in progress, and for delaying transportation of each subsequent callback to said calling thread while said callback indicator indicates that another callback is in progress; and means for deleting said callback indicator in said call block upon completion of each callback.

10. The computer system of claim 8, further including:

means for blocking transportation of callbacks to the calling thread from the at least one respective helper thread after the called server thread has completed processing of the remote procedure call from the calling thread.

11. The computer system of claim 9, further including:

said callback means including:

means for storing in the call block a completion indicator when the called server thread has completed processing of the remote procedure call;

means for determining, while accessing said call bock during callbacks by each respective helper thread, whether said call block contains said completion indicator; and means for preventing callbacks by the at least one respective helper thread to the calling thread when said call block contains said completion indicator.

12. The computer system of claim 8, further including:

means for blocking transportation of callbacks to the calling thread from the at least one respective helper thread after the called server thread has completed processing of the remote procedure call from the calling thread.

13. The computer system of claim 8, further including:

said callback means including:

means for storing in the call block a completion indicator when the called server thread has completed processing of the remote procedure call;

means for determining, while accessing said call block during callbacks by each respective helper thread, whether said call block contains said completion indicator; and means for preventing callbacks by the at least one respective helper thread to the calling thread when said call block contains said completion indicator.

14. The computer system of claim 8, said means for creating including means for storing for each respective helper thread a respective thread execution block having a pointer to said call block; and said callback means including means for accessing said call block by accessing said respective thread execution block to retrieve said pointer to said call block and then accessing said call block with said retrieved pointer.

* * * * *